(12) United States Patent
Park (10) Patent No.: US 7,203,847 B2
(45) Date of Patent: Apr. 10, 2007

(54) POWER SUPPLY FOR CENTRAL PROCESSING UNIT

(75) Inventor: Sung Jin Park, Koyang-si (KR)

(73) Assignee: LG Electronics Inc., Seoul (KR)

( * ) Notice: Subject to any disclaimer, the term of this patent is extended or adjusted under 35 U.S.C. 154(b) by 646 days.

(21) Appl. No.: 10/188,362

(22) Filed: Jul. 3, 2002

(65) Prior Publication Data

US 2003/0009702 A1     Jan. 9, 2003

(30) Foreign Application Priority Data

Jul. 5, 2001   (KR) ............................... 2001-40154

(51) Int. Cl.
  *G06F 1/26*   (2006.01)
(52) U.S. Cl. ..................................... 713/300
(58) Field of Classification Search ................ 713/300, 713/320, 323
  See application file for complete search history.

(56) References Cited

U.S. PATENT DOCUMENTS

| | | | | |
|---|---|---|---|---|
| 5,627,412 A * | 5/1997 | Beard | ........................... | 307/82 |
| 5,812,860 A * | 9/1998 | Horden et al. | ............... | 713/322 |
| 5,903,182 A * | 5/1999 | Jordan | ........................ | 327/540 |
| 6,085,330 A * | 7/2000 | Hewitt et al. | ................ | 713/322 |
| 6,181,895 B1 * | 1/2001 | Hirst | ........................... | 399/88 |
| 6,425,086 B1 * | 7/2002 | Clark et al. | .................. | 713/322 |
| 6,523,128 B1 * | 2/2003 | Stapleton et al. | ........... | 713/330 |
| 6,675,304 B1 * | 1/2004 | Pole et al. | ................... | 713/322 |
| 6,715,090 B1 * | 3/2004 | Totsuka et al. | ............. | 713/323 |
| 6,738,068 B2 * | 5/2004 | Cohen et al. | ................ | 345/519 |
| 6,744,301 B1 * | 6/2004 | Tschanz et al. | ............. | 327/534 |
| 6,762,570 B1 * | 7/2004 | Fosler | ......................... | 315/312 |
| 6,763,471 B1 * | 7/2004 | Aoyama | ...................... | 713/320 |
| 6,772,356 B1 * | 8/2004 | Qureshi et al. | ............. | 713/321 |
| 6,804,591 B1 * | 10/2004 | Miyazawa | .................... | 701/36 |
| 6,848,057 B2 * | 1/2005 | Hicok | ......................... | 713/320 |
| 2001/0007134 A1 * | 7/2001 | Odaohhara | .................. | 713/300 |

* cited by examiner

*Primary Examiner*—Thomas Lee
*Assistant Examiner*—Vincent Tran
(74) *Attorney, Agent, or Firm*—Ked & Associates, LLP

(57) ABSTRACT

A power supply and method for a central processing unit (CPU). The power can include a first power supply circuit such as a DC/DC converter for supplying a voltage of a first level to the CPU when the CPU is in a high activity mode, and a second power supply circuit such as an LDO regulator circuit for supplying a voltage of a second level lower than the first level to the CPU when the CPU is in a low activity mode. The second power supply circuit is preferably efficient when the CPU is in a low load or low activity mode. In such a power supply, when the CPU is in the low activity mode, the LDO regulator circuit is operated to reduce or prevent the efficiency from being degraded, reduce a CPU power consumption and extend a CPU battery lifetime.

50 Claims, 5 Drawing Sheets

(DC/DC Converter)

(LDO Regulator)

Fig. 8

POWER SUPPLY FOR CENTRAL PROCESSING UNIT

BACKGROUND OF THE INVENTION

1. Field of the Invention

The present invention relates to a central processing unit (CPU), and more particularly to a circuit that supplies power to a CPU.

2. Background of the Related Art

An Advanced Configuration and Power Interface (ACPI) is an open system solution including interfaces to hardware, an operating system (OS), software and peripheral devices of a personal computer (PC). ACPI was developed by Intel Corporation, Microsoft Corporation and Toshiba Corporation to support an OS, motherboard hardware and peripheral devices (e.g., a CD-ROM, hard drive, etc.) of a PC such that they can communicate with one another in terms of power use.

A related art power management system can interrupt the supply of power to devices after the lapse of certain disable periods of the devices because it is based on a basic input/output system (BIOS). However, the main goal of the ACPI is to support an Operating System Directed Power Management (OSPM) such that the OS can manage all power activities to supply power to devices only when necessary.

The ACPI was published in 1996 and defined power states of a CPU as C0, C1, C2 and C3. The C0 is a normal state, C1 is a halt state, C2 is a stop-grant state, and C3 is a stop clock state.

In the C2 state, the CPU performs a small or minimum amount of activity such as a snooping operation for maintaining a cache relevance. In the C3 state, which is a deep sleep state, no external clock is supplied to the CPU, thereby causing all activities of the CPU, excluding a function of maintaining data stored in a cache memory in the CPU, to be stopped. As a result, power consumption in the C3 state is reduced still more as compared with a CPU in the C2 state. In this regard, ACPI is very useful to a portable system with a limited battery lifetime.

An Intel Mobile Voltage Positioning (IMVP) II is an advanced voltage rectification technique recently developed by Intel Corporation. The IMVP II adds a new power state C4, or a deeper sleep state, to the power states C0~C3 predefined by the ACPI to lower a supply voltage to the CPU when the CPU is not in operation and further reduce power consumption.

Figure 1:
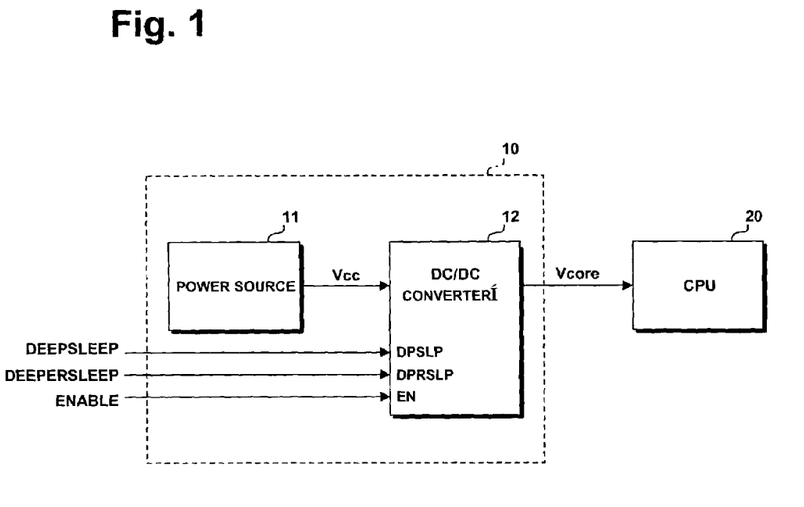
FIG. 1 is a block diagram showing a related art system for supplying power to a CPU in a computer system.

FIG. 1 is a block diagram showing a scheme for supplying power to a CPU in a computer system. As shown in FIG. 1, a power supply 10 includes a power source 11, such as an alternating current (AC) adapter or battery, and a DC/DC converter 12 for converting a direct current (DC) voltage from the power source 11 into a DC voltage Vcore of a level appropriate to a CPU 20 and outputting the converted DC voltage Vcore to the CPU 20.

The DC/DC converter 12 receives information signals DEEPSLEEP and DEEPERSLEEP about a current power state of the CPU 20 provided from a south-bridge controller (not shown) and supplies a DC voltage of a level corresponding to the received information signals to the CPU 20. For example, where the power state of the CPU is C0, C1, C2 or C3, the DC/DC converter 12 converts the DC voltage Vcc (e.g., 3.3V) supplied from the power source 11 into a normal DC voltage (e.g., an AC adapter/battery mode: 1.15V/1.05V) and provides the converted normal DC voltage Vcore to the CPU 20.

When the CPU 20 is in the power states C0~C3, the power state information signals DEEPSLEEP and DEEPERSLEEP are both low in level (i.e., logic '0') or the signals are respectively high in level (i.e., logic '1') and low in level. Alternatively, if the power state information signal DEEPERSLEEP is high in level (i.e., the power state of the CPU is C4), that is, if a predetermined period of time has elapsed from the C3 state, the DC/DC converter 12 converts the DC voltage Vcc supplied from the power source 11 into a low DC voltage Vcore (0.85V) and provides the converted low voltage Vcore to the CPU 20.

Figure 2:
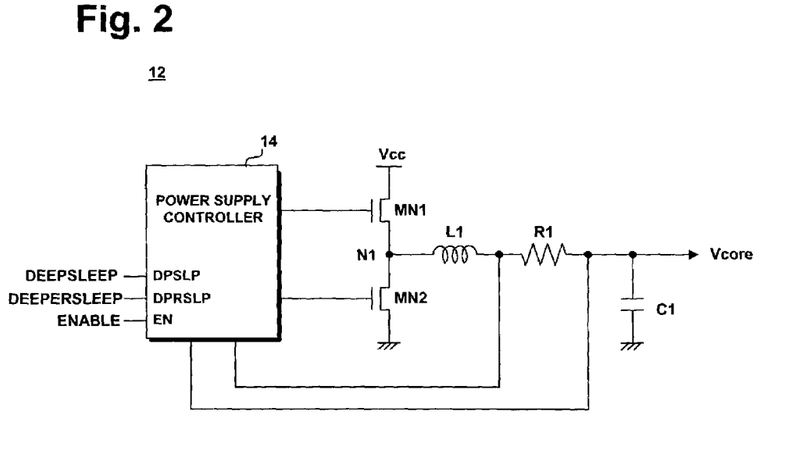
FIG. 2 is a circuit diagram showing an example of a DC/DC converter of FIG. 1.

FIG. 2 is a circuit diagram showing an example of the DC/DC converter 12 in FIG. 1. As shown in FIG. 2, the DC/DC converter 12 includes a power supply controller 14 which may be, for example, SC1471 "Power Supply Controller for Portable Pentium® IV SpeedStep™ Processors", available from SEMTECH Corporation. The power supply controller 14 is adapted to generate control signals in response to the power state information signals DEEPSLEEP and DEEPERSLEEP. The DC/DC converter 12 further includes an NMOS transistor MN1 having a current path formed between a supply voltage Vcc from the power source 11 and a node N1, and a gate is controlled in response to a control signal from the power supply controller 14. An NMOS transistor MN2 has a current path formed between the node N1 and a ground voltage VSS with a gate controlled in response to another control signal from the power supply controller 14. An inductor L1 and a resistor R1 are connected in series between the node N1 and an output terminal that outputs the converted DC voltage Vcore, and a capacitor C1 connected between the output terminal and the ground voltage VSS.

As described above, the DC/DC converter 12 supports a deeper sleep mode as well as a deep sleep mode. The DC/DC converter 12 and outputs the voltage (e.g., 0.85V) lower than the normal voltage (e.g., 1.15~1.05V) in the deeper sleep mode.

Figure 3:
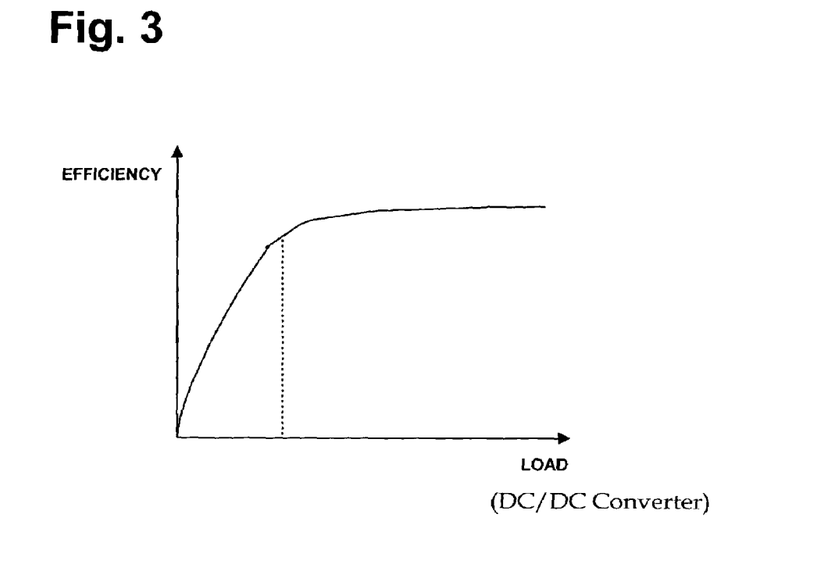
FIG. 3 is a graph showing a load-based efficiency characteristic of the DC/DC converter of FIG. 1.
Figure 4:
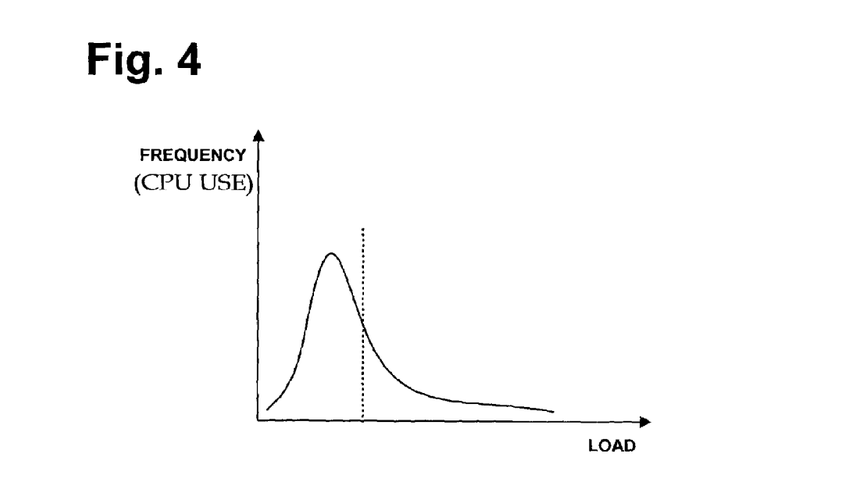
FIG. 4 is a graph showing frequency of activity states of a general CPU.

FIG. 3 is a graph showing a load-based efficiency characteristic of the DC/DC converter 12 in FIG. 1. FIG. 4 is a graph showing the frequency of activity states of a general CPU in a portable computer.

As shown in FIG. 3, the DC/DC converter 12 is very low in power efficiency when an amount of load is less than a predetermined value. That is, the DC/DC converter 12 is poor in efficiency when the CPU 20 is in a low activity state such as the deep sleep mode or deeper sleep mode. When the CPU 20 is in the low activity state, the DC/DC converter 12 is low in efficiency because of various factors. First, power consumption of the power supply controller 14. Second, switching drive power to the transistors MN1 and MN2. Third, a loss caused by a drain to source resistance $R_{DSCON}$ when the transistors MN1 and MN2 are turned on. Fourth, a loss because of the feedback sense resistor R1 for power stabilization.

Further, as shown in FIG. 4, the CPU 20 is generally in the low activity state more frequently than in a high activity state. This is understood from the fact that a time required for a user to input keys, move a mouse or read information displayed on a monitor is longer than a CPU operating time when the user conducts a specific task using a computer system.

As described above, there is a need in the related art for a new power supply scheme that is not degraded in efficiency even when the CPU 20 is in the low activity state. The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a power supply for a CPU that improves a power efficiency when the CPU is in low activity state, a low load state or both.

Another object of the present invention is to provide a power supply for a CPU that reduces or prevents efficiency from being degraded.

Another object of the present invention is to provide a power supply for a CPU that reduces CPU power consumption and extends battery life.

Another object of the present invention is to provide a power supply for a CPU that receives a power supply voltage and a reduced power supply voltage.

Another object of the present invention is to provide a power supply for a CPU that uses a power supply with a first power circuit that supplies a first level CPU supply voltage and a second power circuit that supplies a second lower level CPU supply voltage.

In accordance with the present invention, at least the above and other objects can be accomplished in a whole or in part by the provision of a power supply for a central processing unit that includes a first circuit that supplies a voltage of a first level to the central processing unit when the central processing unit is in a first activity mode; and a second circuit that supplies a voltage of a second level to the central processing unit when the central processing unit is in a second activity mode, the second level being lower than the first level.

To further achieve the above objects in a whole or in part and in accordance with the present invention, there is provided a portable computer that includes a central processing unit (CPU), and a power supply circuit that supplies power to the CPU, wherein the power supply circuit includes a power supply that outputs first and second reference voltages, a first voltage supply device coupled to the power supply that receives the first reference voltage and outputs a power supply voltage to the CPU in a first activity state of the CPU, and a second voltage supply device that receives the second reference voltage and outputs the power supply voltage to the CPU in a second activity state, wherein the first activity state is different than the second activity state.

To further achieve the above objects in a whole or in part and in accordance with the present invention, there is provided a method for supplying power to a central processing unit (CPU) in a portable device that includes determining whether a CPU is operating in a first mode or a second mode that consumes less power than the first mode, providing first and second reference voltages in said first and second modes, respectively, supplying a first supply voltage to the CPU in the first mode in response to the first reference voltage, and supplying a second supply voltage to the CPU in the second mode in response to the second reference voltage, wherein the first supply voltage is higher than the second supply voltage.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 5:
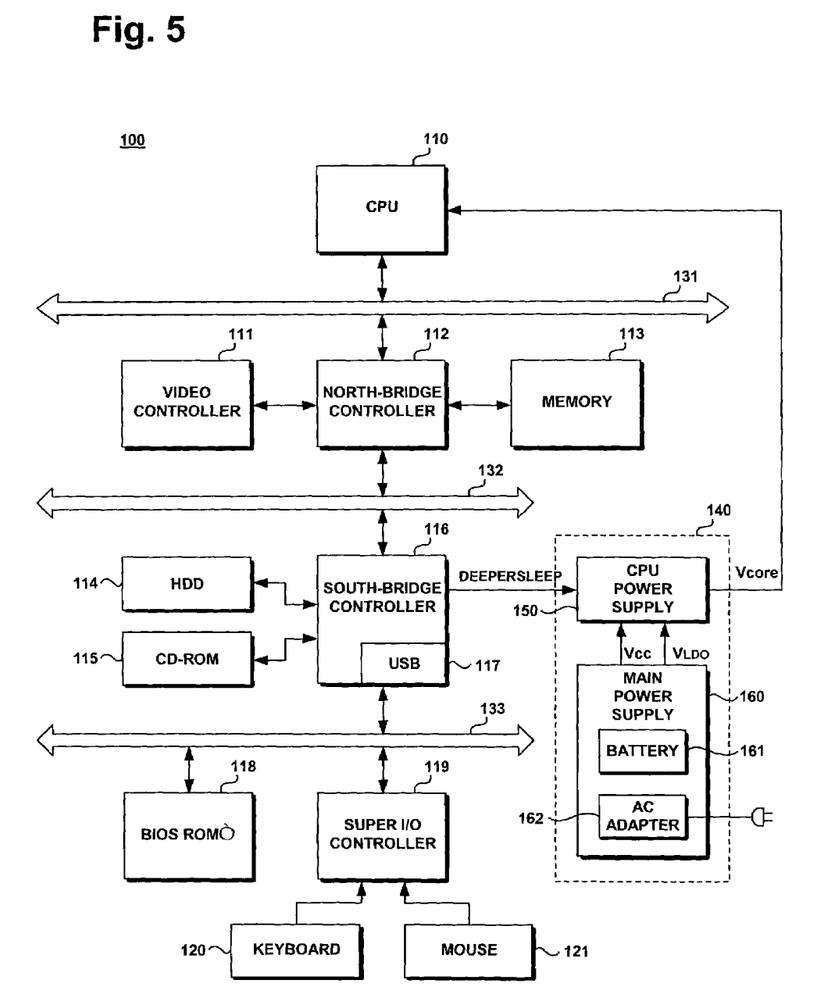
FIG. 5 is a block diagram showing a preferred embodiment of a computer system having a power supply for a CPU in accordance with the present invention.

FIG. 5 is a block diagram showing a circuit construction of a computer system having a power supply for a CPU in accordance with a preferred embodiment of the present invention. As shown, FIG. 5 a computer system 100 includes a central processing unit (CPU) 110 coupled to a host bus 131 for controlling all the system operation, a video controller 111 for processing a video signal can include a video chipset, and a memory 113 for storing various programs and data. A north-bridge controller 112 is coupled to the video controller 111 and memory 113 and for providing an interface between the host bus 131 and a peripheral component interconnect (PCI) bus 132, and a south-bridge controller 116. The south-bridge controller preferably drives peripheral devices, such as a hard disk drive 114 and a CD-ROM drive 115, and provides an interface between the PCI bus 132 and an industry standard architecture (ISA) bus 133. The computer system 100 further preferably includes a super input/output (I/O) controller 119 for controlling input devices, such as a keyboard 120 and a mouse 121, a basic input/output system (BIOS) ROM 118 for storing data and a program for setting up input/output environments of the computer system 100, and a power supply module 140 for supplying power necessary to the computer system 100. In the preferred embodiment shown in FIG. 5, the south-bridge controller 116 is preferably adapted to output information signals (for example, DEEPSLEEP, DEEPERSLEEP, etc.) about a current power state of the CPU. However, the present invention is not intended to be so limited.

The power state information signal DEEPERSLEEP is preferably a 1.5V CMOS level signal that indicates that the CPU has entered a deeper sleep mode when it is low in level. In a deeper sleep mode, a voltage of a reduced or minimum level must be applied as a core voltage of the CPU.

The power supply module 140 includes a main power supply 160 for converting a DC voltage from an AC adapter 162 or battery 161 into various DC voltages (5V, 3.3V, 1.35V, 1.2V, etc.) necessary to the computer system 100 and supplying the converted voltages to the computer system 100%. A CPU power supply 150 converts power from the main power supply 160 into power appropriate to the CPU 110 and supplies the converted power to the CPU 110. As shown in FIG. 5, the main power supply 160 output a Vcc voltage (e.g., 3.3V) and a reduced voltage or load dropout (LDO) voltage (e.g., 1.2V). Construction and operations of the CPU power supply 150 will now be described in detail with reference to FIG. 6.

Figure 6:
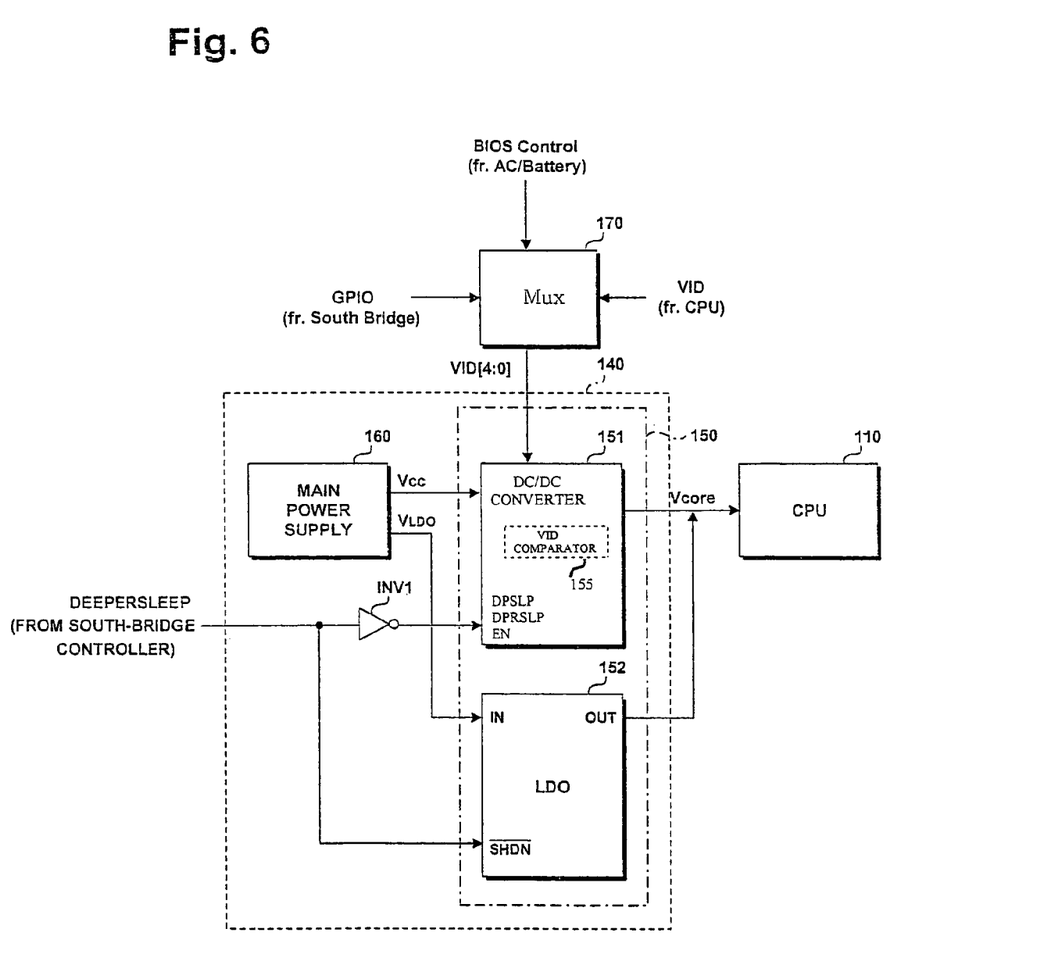
FIG. 6 is a block diagram showing a preferred embodiment of a power supply of FIG. 5 for the CPU.

FIG. 6 is a block diagram showing a preferred embodiment of a power supply module according to the present invention. As shown, the preferred embodiment of the power supply module in FIG. 6 can be used for the power supply module 140. However, the present invention is not intended to be so limited. As shown in FIG. 6, the CPU power supply 150 includes a DC/DC converter 151 and a low dropout (LDO) regulator circuit 152. The DC/DC converter 151 is similar in construction to the DC/DC converter 12 in FIG. 2, but is different in operations from the DC/DC converter 12. Accordingly, a detailed construction description is omitted here however operations will now be described. The CPU power state information signal DEEPERSLEEP outputted from the south-bridge controller 116 is preferably inverted by an inverter INV1 and then inputted to an enable terminal EN of the DC/DC converter 151. If the output signal from the inverter INV1 is high level (in this case because, the information signal DEEPERSLEEP is low in level), the DC/DC converter 151 converts a DC voltage Vcc (for example, 3.3V) from the main power supply 160 into a normal DC voltage (for example, 1.15~1.05V) and outputs the converted normal voltage as an operating voltage Vcore to the CPU 110. However when, the output signal from the inverter INV1 is low level (e.g., the information signal DEEPERSLEEP is high level), the DC/DC converter 151 preferably performs no DC/DC conversion operation.

The LDO regulator circuit 152 has an input terminal IN for receiving an output voltage $V_{LDO}$, for example, 1.2V from the main power supply 160, a shutdown input terminal /SHDN and an output terminal OUT. The shutdown input terminal /SHDN preferably receives the information signal DEEPERSLEEP from the south-bridge controller 116 or the like. The LDO regulator circuit 152 may be implemented with, for example, LT1764 series "3A Fast Transient Response Low Noise LDO Regulator," available from LINEAR TECHNOLOGY Corporation. However, the present invention is not intended to be so limited.

When the power state information signal DEEPERSLEEP inputted through the shutdown input terminal /SHDN is high level, the LDO regulator circuit 152 converts the DC voltage $V_{LDO}$ (e.g., 1.2V) from the main power supply 160 into a reduced or low voltage (e.g., 0.85V) and outputs the converted low voltage as the operating voltage Vcore to the CPU 110. Alternatively, if the information signal DEEPERSLEEP is low level, the LDO regulator circuit 52 preferably shuts down its output and also performs no DC voltage regulating.

In other words, the DC/DC converter 151 receives a first input voltage Vcc (e.g., 3.3V) and supplies the normal voltage of 1.15 to 1.05V as the operating voltage Vcore to the CPU 110 and the LDO regulator circuit 152 receive a second input voltage VLDO (e.g., 1.2V) and provides the reduced voltage of 0.85V as the operating voltage Vcore. Preferably, according to the CPU power state information signal DEEPERSLEEP from the south-bridge controller 116, the DC/DC converter 151 or the LDO regulator circuit 152 supplies the operating voltage Vcore to the CPU 110. Preferably, the other one of the DC/DC converter 151 or the LDO regulator circuit 152 is disabled.

On the other hand, CPUs are typically classified into a normal voltage mode version and a low voltage mode version. The CPU of the normal voltage mode version has an operating voltage ranging from 1.4V (an AC adapter mode) to 1.15V (a battery mode), and the CPU of the low voltage mode version has an operating voltage ranging from 1.15V (the AC adapter mode) to 1.05V (the battery mode).

A preferred embodiment of a method for supplying the operating voltages to the normal voltage mode and the low voltage mode type of CPU versions will now be described. The preferred embodiment of the method will now be described with reference to FIGS. 5–6.

Both the two versions of CPUs are preferably supplied with 0.85V in the C4 state (e.g., DEEPERSLEEP state). Upon power-up, in the battery mode, voltage identification (VID) data [4:0] from the CPU is inputted to a VID comparator 155 in the DC/DC converter 151 through a multiplexer (Mux) 170 shown in FIG. 6.

The DC/DC converter has data that relates VID to $V_{DAC}$ voltage. The VID comparator preferably compares the input VID data [4:0] with (VIS) data stored in the DC/DC converter and outputs $V_{DAC}$ as a result of the comparison. Upon power-up, the VID data [4:0] is 01110 in the battery mode.

When the CPU is in any one of the ACPI C0–C3 states, the VID data [4:0] is 01110, too, thereby causing $V_{DAC}$ of 1.05V to be supplied as the CPU operating voltage from the DC/DC converter 151.

On the other hand, upon power-up in the AC adapter mode, a system BIOS first sets a GPIO register, or VID [4:0], in a south bridge to 01100 and then switches the Mux 170 to the output of the south bridge GPIO register, so the VID comparator in the DC/DC converter 151 outputs $V_{DAC}$ of 1.15V as in the battery mode. In the AC adapter mode, the CPU is also supplied with 1.15V from the DC/DC converter when it is in any one of the C0–C3 states.

In either the AC adapter/battery mode, the south bridge or power management unit can determine a system activity and output a deeper sleep signal as a result of the determination. As shown in FIG. 6, the deeper sleep signal is inverted by the inverter INV1 and then applied to an enable pin EN of the DC/DC converter 151. Thus, the DC/DC converter 151 output is stopped when inputting 'High' to an internal shutdown pin of the LDO regulator circuit 152.

The LDO regulator circuit 152 shuts down its output if 'Low' is inputted to the shutdown pin, and provides its output if 'High' is inputted to the shutdown pin /SHDN. When the CPU is in a low load state, the DC/DC converter 151 is abruptly degraded in efficiency, which results in an increase in power consumption. However, the LDO regulator circuit 152 exhibits an excellent efficiency characteristic both when the CPU is in the low load state and when it is in a high load state. Thus, if the deeper sleep signal is inputted to indicate that the CPU is in the C4 state, or the low load state, the LDO regulator circuit output 152 (0.85V) is preferably used. As a result, power consumption is reduced.

Figure 7:
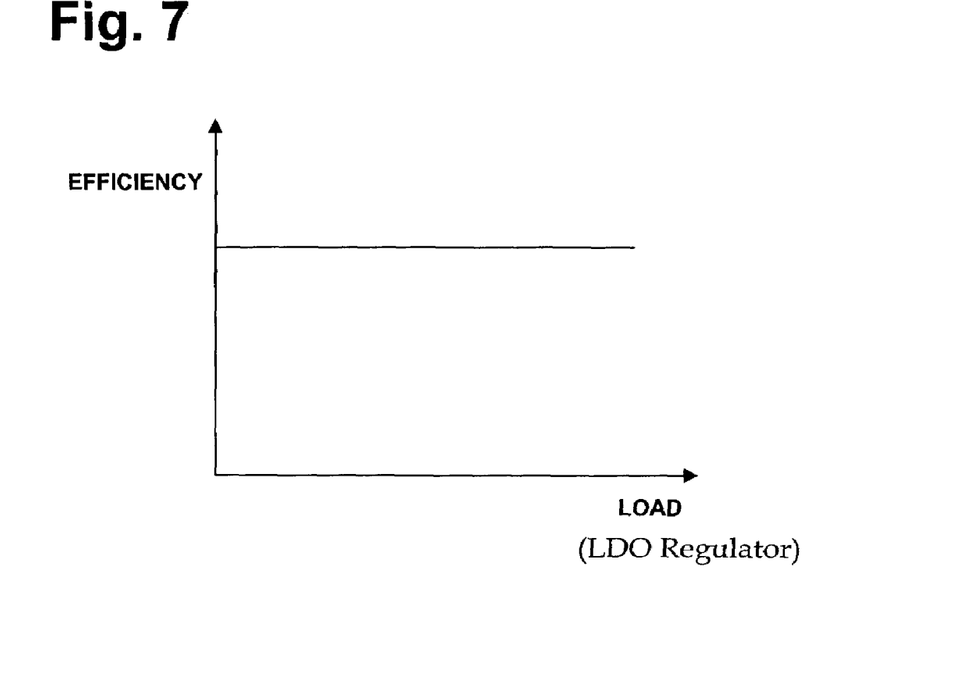
FIG. 7 is a graph showing a load-based efficiency characteristic of an LDO regulator circuit of FIG. 6.
Figure 8:
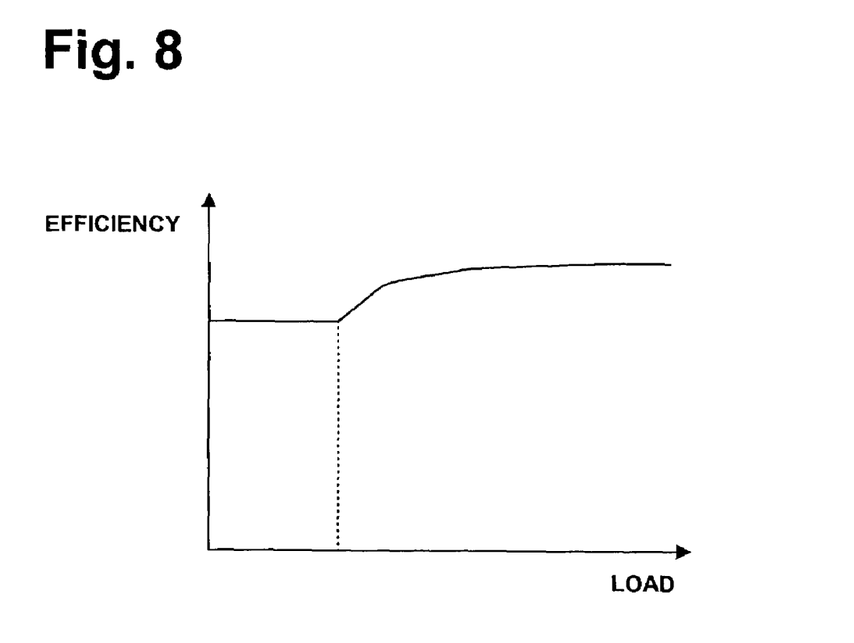
FIG. 8 is a graph showing a load-based efficiency characteristic of the CPU power supply of FIG. 6.

The LDO regulator circuit input is preferably about 1.2V to provide the LDO regulator circuit output of 0.85V. Further, the DC/DC converter and LDO regulator circuit may be designed in a one or two chip solution or circuit FIG. 7 is a graph showing a load-based efficiency characteristic of the LDO regulator circuit 152 of FIG. 6, and FIG. 8 is a graph showing a load-based efficiency characteristic of the CPU power supply 150 in FIG. 6. As shown in FIG. 7, preferably the LDO regulator circuit 152 always has the same approximate high efficiency when the CPU 110 is in either the high activity state or the low activity state. However, as shown in FIG. 3, the DC/DC converter 151 is very poor in efficiency when the CPU 110 is in the low activity state, but relatively good in efficiency when the CPU 110 is in the high activity state.

Accordingly, the LDO regulator circuit 152 is operated when the CPU 110 is in the low activity state (for example, the ACPI C3 state (deep sleep state), deeper sleep state or the like), and the DC/DC converter 151 is operated when the CPU 110 is in the high activity state (for example, the ACPI C0, C1 or C2 state), which enables the CPU power supply 150 to exhibit an excellent efficiency characteristic, for example, as shown in FIG. 8. Therefore, the amount of power consumed in the DC/DC converter, which has a low efficiency when the CPU is in the low activity state or the low load state, is reduced or eliminated to extend a battery lifetime of the entire system.

Although the LDO regulator circuit 152 has generally been disclosed to operate only in the deeper sleep state of the CPU 110, those skilled in the art will know that it can be modified operate in additional modes such as in the deep sleep state, or the C3 state, of the CPU 110.

As described above, preferred embodiments of a power supply device and method for a personal computer have various advantages. The preferred embodiments according to the present invention provides a power supply for a CPU wherein an LDO regulator circuit is operated in a low activity mode of the CPU to prevent a power efficiency from being degraded, to reduce system power consumption and to extend the lifetime of a battery.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A power supply for a central processing unit, comprising:
    a first circuit to supply a voltage of a first level to said central processing unit when said central processing unit is in a first activity state;
    a second circuit to supply a voltage of a second level to said central processing unit when said central processing unit is in a second activity state, said second level being different than said first level;
    a third circuit to determine whether the central processing unit is in the first or second activity state and to output a control signal to the first and second circuits as a result of the determination, wherein the first activity state is a high activity state and the second activity state is a low activity state and wherein the first circuit is enabled to output the first-level voltage when the control signal assumes a first logical value and the second circuit is enabled to output the second-level voltage when the control signal assumes a second logical value;
    a comparator to compare voltage identification data (VID) to pre-stored data,
    wherein the first circuit generates a $V_{DAC}$ voltage based on the comparison.

2. The power supply of claim 1, wherein said high activity state corresponds to one of C0~C2 states defined in Advanced Configuration and Power Interface (ACPI), and wherein said low activity state corresponds to a C3 state defined in the ACPI or a reduced voltage supply state.

3. The power supply of claim 1, wherein said second activity state includes a C4 state defined in an Advanced Configuration and Power Interface (ACPI) standard.

4. The power supply of claim 1, wherein said low activity state includes a deep sleep state.

5. The power supply of claim 1, wherein said low activity state includes a deeper sleep state.

6. The power supply of claim 1, wherein said first activity state includes C0, C1, C2 and C3 states defined in an Advanced Configuration and Power Interface (ACPI) standard.

7. The power supply of claim 1, wherein said first and second circuits are configured on one chip.

8. The power supply of claim 1, wherein said first and second circuits operate in response to said control signal.

9. The power supply of claim 1, wherein if said first circuit operates when said CPU is in said second activity state, said second circuit has a higher efficiency than an efficiency of said first circuit in said second activity state.

10. The power supply of claim 1, wherein the first activity state or the second activity state corresponds to one of C0–C4 states in ACPI specification.

11. The power supply of claim 1, wherein the second circuit is disabled when the control signal assumes the first logical value and the first circuit is disabled when the control signal assumes the second logical value.

12. The power supply of claim 11, further comprising:
    an inverter coupled between the first and third circuits,
    wherein the inverter generates the second logical value of the control signal which disables the first circuit.

13. The power supply of claim 1, wherein the control signal is a C4 deeper sleep power state signal.

14. The power supply of claim 1, further comprising:
    a fourth circuit coupled to the first and second circuits,
    wherein the fourth circuit generates a first supply voltage which is converted by the first circuit into the first-level voltage, and generates a second supply voltage which is converted by the second circuit into the second-level voltage, the first supply voltage being greater than the second supply voltage.

15. The power supply of claim 14, wherein the second supply voltage corresponds to a load dropout voltage.

16. The power supply of claim 14, wherein the second supply voltage is set proportional to a deeper sleep state mode of operation of the central processing unit.

17. The power supply of claim 1, wherein the second circuit has substantially the same efficiency when the central processing unit is in the first and second activity states.

18. The power supply of claim 17, wherein the second activity state is a sleep state.

19. The power supply of claim 17, wherein the second activity state is a deeper sleep state.

20. The power supply of claim 1, wherein the pre-stored data is VIS data.

21. The power supply of claim 1, wherein the comparator is included in the first circuit.

22. The power supply of claim 1, wherein the VID data is generated by the central processing unit at power-up in battery mode.

23. The power supply of claim 1, wherein the VID data is generated by a BIOS control circuit.

24. The power supply of claim 1, wherein the VID data is received from a GPIO register at power-up in AC adaptor mode.

25. The power supply of claim 1, wherein the VID data is set based on whether a system containing the central processing unit is in battery mode or AC adapter mode.

26. The power supply of claim 1, further comprising:
    a selector to select different VID data based on a mode of operation of a system containing the central processing unit.

27. The power supply of claim 26, wherein the selector selects first VID data when the system is in battery mode and second VID data when the system is in AC adapter mode.

28. The power supply of claim 27, wherein the selector includes a multiplexer which receives a signal for selecting the first VID data or the second VID data from a control circuit.

29. The power supply of claim 28, wherein the control circuit is a BIOS control circuit or the central processing unit.

30. The power supply of claim 1, wherein the $V_{DAC}$ voltage is supplied to form an operating voltage of the central processing unit in a predetermined mode.

31. A portable computer of, comprising:
a central processing unit (CPU); and
a power supply circuit that supplies power to the CPU, wherein the power supply circuit comprises:
a power supply that outputs first and second reference voltages,
a first voltage supply device coupled to the power supply that receives the first reference voltage and outputs a first power supply voltage to the CPU in a first activity state of the CPU,
a second voltage supply device that receives the second reference voltage and outputs a second power supply voltage to the CPU in a second activity state, wherein the first activity state is different than the second activity state, and
a controller that determines whether the CPU is in the first activity state or the second activity state and outputs a control signal to the first and/or second voltage supply devices based on the determination, wherein the first activity state corresponds to a high activity state and the second activity state corresponds to a low activity state and
wherein the first voltage supply device is enabled to output the first power supply voltage to the CPU in the first activity state when the control signal assumes a first logical value and the second voltage supply device is enabled to output the second power supply voltage to the CPU in the second activity state when the control, signal assumes a second logical value, and
wherein the power supply circuit further includes a comparator to compare voltage identification data (VID) to pre-stored data, the first voltage supply device generating a $V_{DAC}$ voltage based on the comparison.

32. The portable computer of claim 31, wherein the first power supply voltage to the CPU is a first level and the second power supply voltage to the CPU is a second level lower than the first level.

33. The portable computer of claim 32, wherein the first level lies in a range between 1.05 and 1.15 volts and the second level is substantially 0.85 volts.

34. The portable computer of claim 31, wherein the power supply is coupled to one of an AC adapter and a battery.

35. The portable computer of claim 31, wherein said high activity state corresponds to one of C0~C2 states defined in Advanced Configuration and Power Interface (ACPI), and wherein said low activity state corresponds to a C3 state defined in the ACPI or a reduced voltage supply state.

36. The portable computer of claim 31, wherein said low activity state includes a deeper sleep state.

37. The portable computer of claim 31, wherein said first and second voltage supply devices are configured on one chip.

38. The portable computer of claim 31, wherein only one said first and second voltage supply devices operate in response to said control signal and the other of said first and second voltage supply devices is disabled.

39. The portable computer of claim 31, wherein the first activity state or the second activity state corresponds to one of C0–C4 states in ACPI specification.

40. The portable computer of claim 31, wherein the first voltage supply device is disabled when the control signal assumes the second logical value and the second voltage supply device is disabled when the control signal assumes the first logical value.

41. The portable computer of claim 31, wherein the control signal is a C4 deeper sleep power state signal.

42. The portable computer of claim 31, wherein the pre-stored data is VIS data.

43. The portable computer of claim 31, wherein the VID data is set based on whether the computer is in battery mode or AC adapter mode.

44. The portable computer of claim 31, further comprising:
a selector to select different VID data based on a mode of operation of a system containing the central processing unit.

45. The portable computer of claim 31, wherein the $V_{DAC}$ voltage is supplied to form an operating voltage of the CPU in a predetermined mode.

46. A method of supplying power to a central processing unit (CPU) in a portable device, comprising:
determining whether the CPU is operating in a first state or a second state that consumes less power than the first state, the determining being based on a control signal;
supplying a first supply voltage from a first power generator circuit to the CPU in the first state in response to the control signal; and
supplying a second supply voltage from a second power generator circuit to the CPU in the second state in response to the control signal, wherein the first supply voltage is higher than the second supply voltage and wherein the first power generator circuit is enabled to output the first supply voltage when the control signal assumes a first logical value and the second power generator circuit is enabled to output the second supply voltage when the control signal assumes a second logical value, and wherein the control signal is a C4 deeper sleep power state signal, said method further comprising comparing voltage identification data (VID) to pre-stored data and generating a $V_{DAC}$ voltage based on the comparison.

47. The method of claim 46, wherein the first power generator circuit is different than the second power generator circuit.

48. The method of claim 47, wherein in the first state the second power generator circuit is disabled, and wherein in the second state the first power generator is disabled.

49. The method of claim 46, wherein the first state or the second state corresponds to one of C0–C4 states in ACPI specification.

50. The method of claim 46, wherein the $V_{DAC}$ voltage is supplied to form an operating voltage of the CPU in a predetermined mode.

* * * * *